United States Patent
Severns

(10) Patent No.: US 10,608,438 B2
(45) Date of Patent: Mar. 31, 2020

(54) ELECTRICAL POWER GENERATION SYSTEM AND METHOD FOR AIRCRAFT

(71) Applicant: The Boeing Company, Chicago, IL (US)

(72) Inventor: Christopher Mark Severns, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 154 days.

(21) Appl. No.: 15/955,313

(22) Filed: Apr. 17, 2018

(65) Prior Publication Data

US 2019/0319458 A1    Oct. 17, 2019

(51) Int. Cl.
*H02J 3/44* (2006.01)
*B64D 41/00* (2006.01)
*B60R 16/03* (2006.01)

(52) U.S. Cl.
CPC .............. *H02J 3/44* (2013.01); *B64D 41/00* (2013.01); *B60R 16/03* (2013.01); *B64D 41/007* (2013.01); *B64D 2221/00* (2013.01)

(58) Field of Classification Search
CPC ............. H02J 3/44; B64D 41/00; B60R 16/03
USPC ......................................................... 307/9.1
See application file for complete search history.

(56) References Cited

U.S. PATENT DOCUMENTS

| 5,311,066 A * | 5/1994 | Malloy | H02J 3/44 |
| | | | 307/64 |
| 6,128,204 A * | 10/2000 | Munro | H02J 3/44 |
| | | | 318/140 |
| 9,793,820 B2 | 10/2017 | Huang et al. | |
| 2006/0119325 A1 * | 6/2006 | Mrowiec | H02J 3/44 |
| | | | 322/22 |
| 2014/0043080 A1 * | 2/2014 | Larsen | H02J 3/46 |
| | | | 327/243 |
| 2016/0094030 A1 * | 3/2016 | Gao | H02J 3/00 |
| | | | 307/38 |
| 2016/0094040 A1 * | 3/2016 | Krolak | H02J 4/00 |
| | | | 318/504 |

(Continued)

*Primary Examiner* — Alfonso Perez Borroto
(74) *Attorney, Agent, or Firm* — Yee & Associates, P.C.

(57) ABSTRACT

A method for generating electrical power comprising operating variable frequency generators using a common prime mover and controlling the variable frequency generators using a mechanical phase difference as follows:

$$MPD = \frac{360}{G\Phi p}$$

wherein MPD is the mechanical phase difference in degrees between rotors between a pair of variable frequency generators, G is a number of variable frequency generators, Φ is a number of electrical phases in a variable frequency generator in the variable frequency generators, and p is a number of pole pairs in the variable frequency generator in the variable frequency generators, wherein the variable frequency generators are controlled such that each variable frequency generator in the variable frequency generators has a selected mechanical phase difference from another variable frequency generator in the variable frequency generators that is an integer multiple of the mechanical phase difference that is less than 360 degrees.

21 Claims, 8 Drawing Sheets

(56) References Cited

U.S. PATENT DOCUMENTS

| | | | |
|---|---|---|---|
| 2016/0126731 A1* | 5/2016 | Gu | G01R 31/42 |
| | | | 324/750.01 |
| 2016/0149404 A1* | 5/2016 | Karimi | H02J 1/102 |
| | | | 307/9.1 |
| 2017/0005357 A1* | 1/2017 | Mermelstein | H01M 8/186 |

* cited by examiner

ELECTRICAL POWER GENERATION SYSTEM AND METHOD FOR AIRCRAFT

BACKGROUND INFORMATION

1. Field

The present disclosure relates generally to power generation and, in particular, to a method, apparatus, and system for generating multiphase electrical power. Still more particularly, the present disclosure relates to a method, apparatus, and system generating multiphase power using multiple generators driven by a common prime mover.

2. Background

Platforms such as aircraft include electrical systems. These electric systems may include, for example, a lighting system, an environmental system, an in-flight entertainment system, a communication system, a navigation computer, and other suitable types of systems. These electrical systems are loads in aircraft that utilize electrical power to operate.

Aircraft systems include components with an ability to generate electrical power. For example, generators are present on commercial aircraft that produce electrical power. These generators are typically driven by sources referred to as prime movers. A prime mover can take the form of an aircraft engine. Further, other types of primers include an auxiliary power unit (APU), a hydraulic motor, a ram air turbine (RAT), a device with a rotating mechanical output or some other suitable type of system that can drive generators.

For example, each aircraft engine can be connected to drive two generators to create electrical power. With two generators per aircraft engine, redundancy is present. The aircraft can operate when one of the two generators does not have a desired level of performance. These generators have outputs connected to an electrical power distribution system. This electrical power distribution system contains one or more buses. The different loads in aircraft are also connected to the buses from which electrical power is distributed for use by the loads.

These generators generate electrical power having three phases. With respect to stability, voltage regulation, efficiency, and reliability, six-phase power is more advantageous than three-phase power. However, regarding six-phase power, additional equipment is often needed. For example, constant frequency generators are used. A challenge is present because the aircraft engine changes speed during different phases and operations of the aircraft. These types of generators employ additional equipment for speed conversion to obtain the constant frequency in view of the changing speeds in the operation of the aircraft engine. This increase in weight in aircraft is undesirable. Further an undesired reduction in power conversion efficiency also can occur.

Therefore, it would be desirable to have a method and apparatus that take into account at least some of the issues discussed above, as well as other possible issues. For example, it would be desirable to have a method and apparatus that overcome a technical problem with generating electric power with a number of phases while reducing the weight needed to generated higher phase electrical power.

SUMMARY

An embodiment of the present disclosure provides an electrical generator system comprising a plurality of variable frequency generators connected to a common prime mover and a phase controller system configured to control the plurality of variable frequency generators using a mechanical phase difference as follows:

$$MPD = \frac{360}{G\Phi p}$$

wherein MPD is the mechanical phase difference in degrees between rotors between a pair of variable frequency generators, G is a number of variable frequency generators, $\Phi$ is a number of electrical phases in a variable frequency generator in the plurality of variable frequency generators, and p is a number of pole pairs in the variable frequency generator in the plurality of variable frequency generators. The phase controller system controls the plurality of variable frequency generators such that each variable frequency generator in the plurality of variable frequency generators has a selected mechanical phase difference from another variable frequency generator in the plurality of variable frequency generators that is an integer multiple of the mechanical phase difference that is less than 360 degrees.

Another embodiment of the present disclosure provides an electrical generator system comprising a plurality of variable frequency generators configured to be connected to a common prime mover and a phase controller system configured to control the plurality of variable frequency generators using a mechanical phase difference as follows:

$$MPD = \frac{360}{G\Phi p}$$

wherein MPD is the mechanical phase difference in degrees between rotors between a pair of variable frequency generators, G is a number of variable frequency generators, $\Phi$ is a number of electrical phases in a variable frequency generator in the plurality of variable frequency generators, and p is a number of pole pairs in the variable frequency generator in the plurality of variable frequency generators. The phase controller system controls the plurality of variable frequency generators such that each variable frequency generator in the plurality of variable frequency generators has a selected mechanical phase difference from another variable frequency generator in the plurality of variable frequency generators that is an integer multiple of the mechanical phase difference that is less than 360 degrees.

Yet another embodiment of the present disclosure provides a method for generating electrical power comprising operating a plurality of variable frequency generators using a common prime mover and controlling the plurality of variable frequency generators using a mechanical phase difference as follows:

$$MPD = \frac{360}{G\Phi p}$$

wherein MPD is the mechanical phase difference in degrees between rotors between a pair of variable frequency generators, G is a number of variable frequency generators, $\Phi$ is a number of electrical phases in a variable frequency generator in the plurality of variable frequency generators, and p is a number of pole pairs in the variable frequency generator in the plurality of variable frequency generators. The plurality of variable frequency generators are controlled such that each variable frequency generator in the plurality of variable frequency generators has a selected mechanical phase difference from another variable frequency generator in the plurality of variable frequency generators that is an integer multiple of the mechanical phase difference that is less than 360 degrees.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
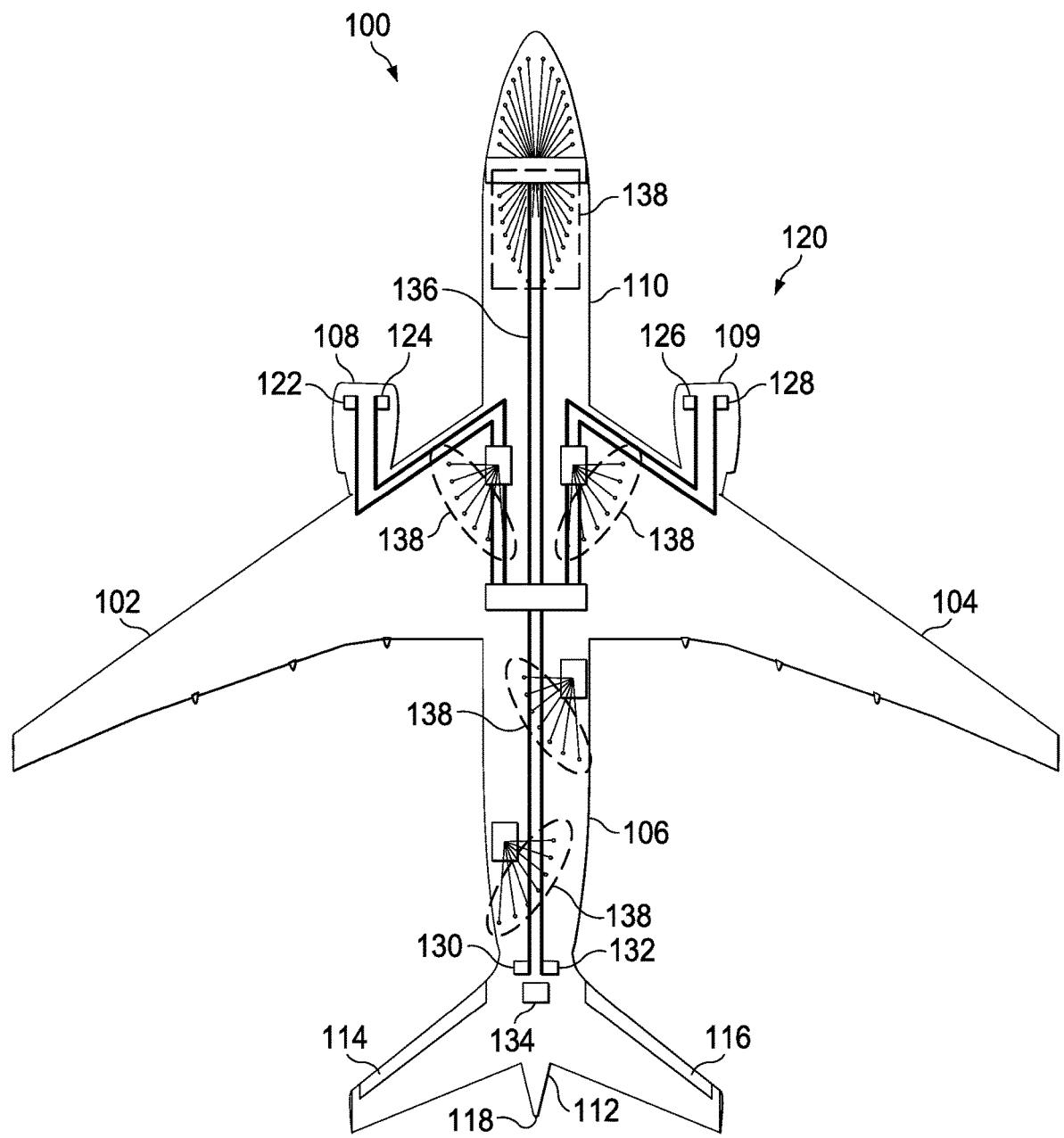
FIG. 1 is an illustration of an aircraft in accordance with an illustrative embodiment.

The illustrative embodiments recognize and take into account one or more different considerations. For example, the illustrative embodiments recognize and take into account that current configurations of generators can place the electrical output of the generators in parallel by relying on synchronizing two or more connected electrical power sources by maintaining the electrical phases in the same electrical phase angle, electrical phase sequence, and electrical frequency. The illustrative embodiments recognize and take into account that the current systems rely on a constant frequency in the operation of the generators. The illustrative embodiments recognize and take into account that speed conversion is utilized to maintain this constant frequency for the generators to take into account the fact that the aircraft engines operate at variable frequencies. These frequencies are for mechanical rotational speeds. The illustrative embodiments recognize and take into account that the use of speed conversion results in losses in efficiency in generating electrical power from a mechanical power source.

Further, the illustrative embodiments recognize that the development of new aircraft generators and engine driven rotating machinery is a multi-year and expensive process. The illustrative embodiments recognize and take in to account that having an ability to connect currently used or installed generators in a parallel configuration is an attractive alternative.

The illustrative embodiments recognize and take into account that current teachings for aerospace power systems are directed to using balanced real and reactive power on generators that have their electrical outputs in parallel. The illustrative embodiments recognize and take into account that, contrary to current teachings, a mismatch or difference in mechanical phases is not necessarily detrimental in generating higher phase electrical power with parallel generators. The illustrative embodiments recognize and take into account that the mismatch or difference in mechanical phases between rotors in generators can be controlled in a manner that provides an increased number of phases when these electrical outputs are placed in parallel. Additionally, this type of control also enables using variable frequency generators to create electrical power. Further, the illustrative embodiments recognize and take into account that through controlling the difference in mechanical phases, reductions in undesired energy oscillations can be achieved in different illustrative examples as described herein.

Thus, the illustrative embodiments provide a method, apparatus, and system for generating electrical power. In one illustrative example, an electrical generator system comprises a plurality of variable frequency generators and a phase controller. The plurality of variable frequency generators is connected to a common prime mover. The phase controller is configured to control the plurality of variable frequency generators using a mechanical phase difference as follows:

$$MPD = 360/G\Phi p$$

wherein MPD is the mechanical phase difference in degrees between rotors between a pair of variable frequency generators, G is a number of variable frequency generators, $\Phi$ is a number of electrical phases in a variable frequency generator in the plurality of variable frequency generators, and p is a number of pole pairs in the variable frequency generator in the plurality of variable frequency generators.

The controller controls the plurality of variable frequency generators such that each variable frequency generator in the plurality of variable frequency generators has a selected mechanical phase difference from another variable frequency generator in the plurality of variable frequency generators that is an integer multiple of the mechanical phase difference that is less than 360 degrees.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 109 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which electrical system 120 may be implemented in accordance with an illustrative embodiment. As depicted, electrical system 120 includes variable frequency generator 122 and variable frequency generator 124 in engine 108. Electrical system 120 also includes variable frequency generator 126 and variable frequency generator 128 in engine 109. Variable frequency generator 122 and variable frequency generator 124 are driven by engine 108. Variable frequency generator 126 and variable frequency generator 128 are driven by engine 109.

Further, electrical system 120 includes variable frequency generator 130 and variable frequency generator 132 in tail section 112. These generators are driven by auxiliary power unit (APU) 134 in tail section 112.

The outputs of these variable frequency generators are connected to bus system 136 and provide electrical power in electrical system 120. Additionally, loads 138 in electrical system 120 are connected to bus system 136 and operate using the electrical power provided through bus system 136.

Figure 2:
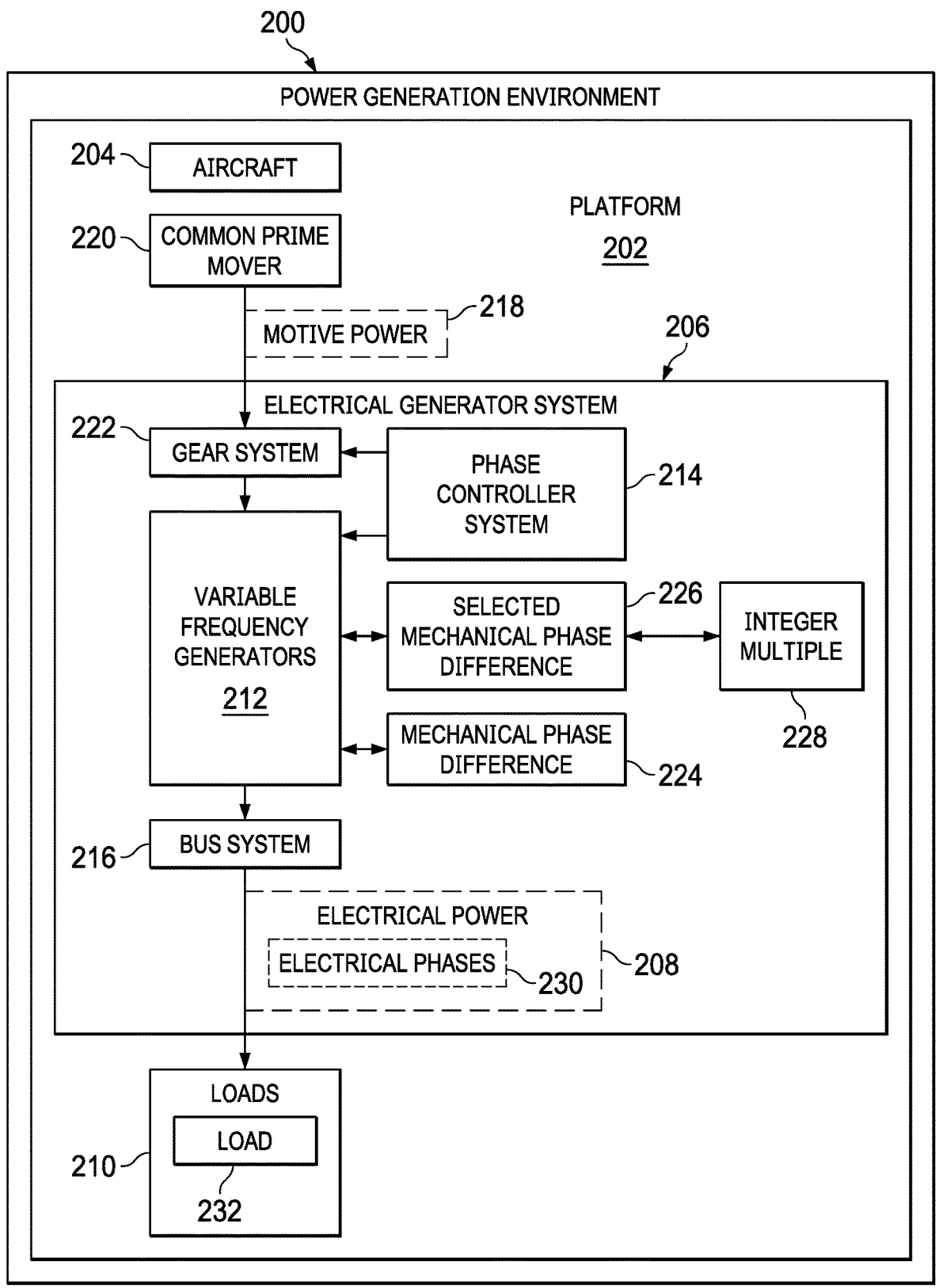
FIG. 2 is an illustration of a block diagram of a power generation environment in accordance with an illustrative embodiment.

With reference next to FIG. 2, an illustration of a block diagram of a power generation environment is depicted in accordance with an illustrative embodiment. As depicted, power generation environment 200 includes platform 202. In the illustrative example, platform 202 takes the form of aircraft 204. Aircraft 100 in FIG. 1 is an example of one implementation for aircraft 204.

As depicted, platform 202 includes electrical generator system 206 that is configured to generate electrical power 208 for use by loads 210 in platform 202. In this illustrative example, electrical generator system 206 comprises a plurality of variable frequency generators 212, phase controller system 214, and bus system 216.

A variable frequency generator in the plurality of variable frequency generators 212 is a physical device that converts motive power 218 into electrical power 208. In this illustrative example, electrical power 208 output by the plurality of variable frequency generators 212 is in the form of an alternating current.

As depicted, common prime mover 220 provides motive power 218 to operate electrical generators system 206. Common prime mover 220 is selected from one of an engine, an aircraft engine, an auxiliary power unit, or some other suitable type of device that can generate motive power 218 to operate the plurality of variable frequency generators 212.

In this illustrative example, the plurality of variable frequency generators 212 is connected to common prime mover 220. As depicted, gear system 222 in phase controller system 214 mechanically connects the plurality of variable frequency generators 212 to common prime mover 220. Common prime mover 220 is the common source of motive power 218 for the plurality of variable frequency generators 212. Gear system 222 is configured such that all of the plurality of variable frequency generators 212 rotate at the same speed with respect to each other. The plurality of variable frequency generators 212, however, can all change the frequency at which they rotate as common prime mover 220 changes speed.

For example, common prime mover 220 can be an engine for aircraft 204. Common prime mover 220 can change speed during different phases of operation of aircraft 204. This change in speed in the aircraft engine is considered a change in frequency which is propagated to the plurality of variable frequency generators 212.

In this illustrative example, phase controller system 214 is configured to control the plurality of variable frequency generators 212 using mechanical phase difference 224 between the different generators in the plurality of variable frequency generators 212. As depicted, mechanical phase difference 224 can be determined as follows:

$$MPD = 360/G\Phi p$$

In this equation, MPD is the mechanical phase difference in degrees between rotors between a pair of variable frequency generators, G is a number of variable frequency generators, $\Phi$ is a number of electrical phases in a variable frequency generator in the plurality of variable frequency generators, and p is the number of pole pairs in the variable frequency generator in the plurality of variable frequency generators.

Phase controller system 214 controls the plurality of variable frequency generators 212 such that each variable frequency generator in the plurality of variable frequency generators 212 has a selected mechanical phase difference 226 from another variable frequency generator in the plurality of variable frequency generators 212 that is integer multiple 228 of mechanical phase difference 224 that is less than 360 degrees.

As a result, phase controller system 214 controls the plurality of variable frequency generators 212 to operate with reduced undesired energy oscillations. In this example, phase controller system 214 controls mechanical phase difference 224 using gear system 222.

For example, two variable frequency generators are in plurality of variable frequency generators 212 and the number of phases is three per variable frequency generator, the number of pole pairs is one, and the mechanical phase difference is 60 degrees, wherein the two variable frequency generators operate in parallel to generate an output voltage having six phases.

In this illustrative example, the electrical outputs of the plurality of variable frequency generators 212 are connected in parallel to bus system 216. This connection is configured to produce electrical power 208 which is produced with a desired number of electrical phases 230 to load 232 in loads 210.

The maximum number of system electrical phases available for load 232 is determined as follows:

$$MSEP = G*\Phi$$

wherein MSEP is the maximum number of system electrical phases, G is the number of variable frequency generators, and $\Phi$ is the number of phases in a variable frequency generator in the plurality of variable frequency generators.

Figure 3:
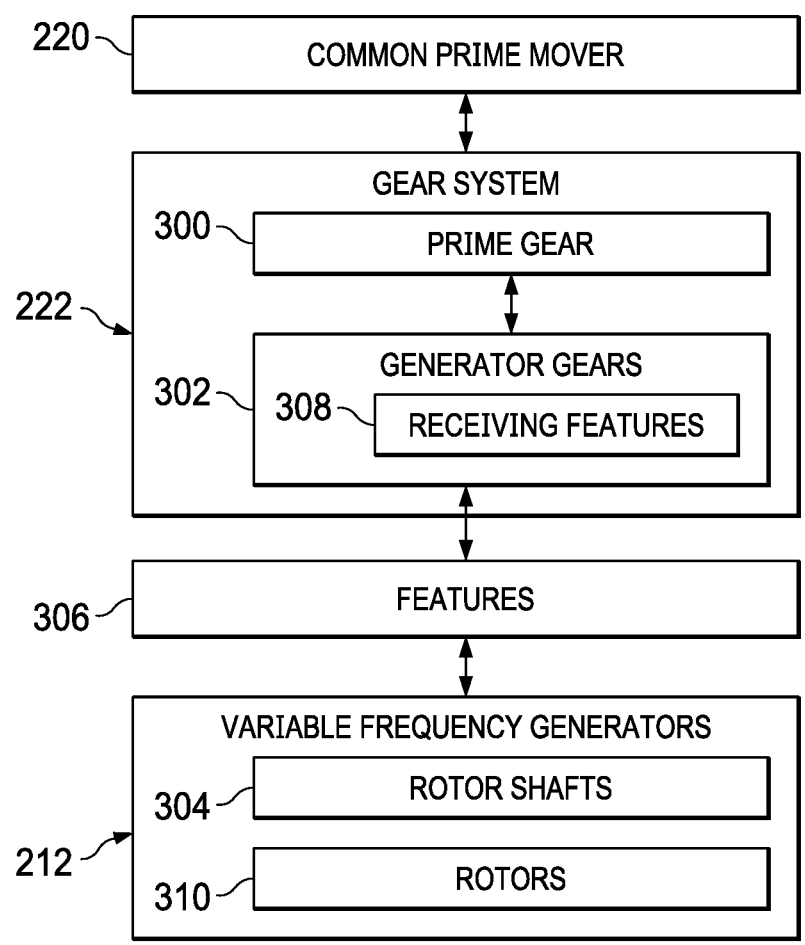
FIG. 3 is an illustration of a block diagram of a gear system in accordance with an illustrative embodiment.

With reference next to FIG. 3, an illustration of a block diagram of a gear system is depicted in accordance with an illustrative embodiment. In the illustrative examples, the same reference numeral may be used in more than one figure. This reuse of a reference numeral in different figures represents the same element in the different figures.

In this illustrative example, gear system 222 has a number of different types of gears. As depicted, gear system 222 comprises prime gear 300 and generator gears 302.

Common prime mover 220 is coupled to prime gear 300 in gear system 222. Common prime mover 220 may be coupled to prime gear 300 using a shaft with a spline, which is a gear attached to the shaft. The spline fits within a corresponding spline or some other feature in prime gear 300. As a result, prime gear 300 rotates when the shaft rotates.

As depicted, prime gear 300 is connected to generator gears 302. This connection may be a direct connection between these gears or in direct connection with one or more gears between prime gear 300 and generator gears 302. When common prime mover 220 rotates prime gear 300, prime gear 300 rotates generator gears 302.

Variable frequency generators 212 are coupled to generator gears 302 in gear system 222. In this illustrative example, variable frequency generators 212 have rotor shafts 304. As depicted, rotor shafts 304 have features 306 and are configured to fit within receiving features 308 in generator gears 302.

In this illustrative example, features 306 and receiving features 308 are configured such that a feature in features 306 can fit with rotors 310 in the plurality of variable frequency generators 212 being in a particular orientation. The configuration of receiving features 308 can be selected, designed, or configured such that rotors 310 in variable frequency generators 212 are oriented with respect to each other to have selected mechanical phase difference 226 in FIG. 2 as described above.

In this manner, a feature in features 306 on a rotor shaft of each of the plurality of variable frequency generators 212 is mechanically connected to a receiving feature in receiving features 308 in a generator gear in generator gears 302 in gear system 222 such that each variable frequency generator in the plurality of variable frequency generators 212 has a selected mechanical phase difference from another variable frequency generator in the plurality of variable frequency generators 212 that is an integer multiple of the mechanical phase difference that is less than 360 degrees.

In one illustrative example, features 306 on rotor shafts 304 may take the form of male splines with receiving features 308 in generator gears 302 taking the form of female splines configured to receive the male splines with desired orientations of rotors 310 to obtain selected mechanical phase difference 226 in FIG. 2. For example, a spline in the female splines may have a different shape or length such that only corresponding spline in the male splines can fit within the female splines with the desired orientation of the rotor shaft. Thus, the orientation of rotors 310 in the plurality of variable frequency generators 212 can be set in a desired orientation when features 306 are engaged with receiving features 308.

In one illustrative example, one or more technical solutions are present that overcome a technical problem with generating electrical power with a desired level of efficiency. As a result, one or more technical solutions in the illustrative examples can provide a technical effect of enabling connecting the electrical output of variable frequency generators in a manner that reduces undesired energy oscillations.

Also, one or more of the technical solutions can reduce undesired energy oscillations that include, for example, real and reactive instantaneous power oscillations and unwanted exchanges between generators, gears in gear systems, prime movers, and loads or other components connected to an electrical bus. Further, one or more of the technical solutions enable using variable frequency generators having a lower number of phases that can be combined in parallel to provide a higher number of phases for use by loads.

Further, one or more technical solutions in the illustrative examples enable utilization of smaller generators to provide a desired number of phases in electrical power for loads that is not possible with currently available configurations of generators driven by aircraft engines or other common prime movers in an aircraft.

The illustration of power generation environment 200 and the different components for this environment in FIG. 2 and FIG. 3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the depicted example shows platform 202 in the form of aircraft 204, electrical power 208 can be generated for loads 210 located in other types of platforms. For example, the platform can be selected from one of a mobile platform, a stationary platform, a land-based structure, an aquatic-based structure, a space-based structure, a commercial aircraft, a rotorcraft, a surface ship, a tank, a personnel carrier, a train, a spacecraft, a space station, a satellite, a submarine, an automobile, a power plant, a wind turbine, a geothermal, hydroelectric or tidal electrical power generation system, a bridge, a dam, a house, a manufacturing facility, and a building.

As another example, one or more prime movers in addition to common prime mover 220 can be present in electrical generator system 206. These additional common prime movers can be used to provide the power for different groupings of variable frequency generators 212. As yet another example, gear system 222 may be located in one or more housings not shown in the depicted illustrations.

In yet another illustrative example, the control of mechanical phase difference 224 between variable frequency generators 212 by phase controller system 214 can be performed using a hydraulic system in addition to or in place of gear system 222.

When using a hydraulic system to mechanically drive a plurality of generators, the hydraulic motor outputs can produce the mechanical phase difference through mechanical phase control interface between the motor rotor and generator rotor or have each respective hydraulic motor swashplate adjusted and the plurality of hydraulic motors installed so that mechanical phase difference is maintained.

In still another illustrative example, an alternating current to direct current components can be employed to generate direct current electrical power from the alternating current electrical power output as electrical power 208 from variable frequency generators 212. The alternating current to director current component may be implemented in a number of different ways. For example, this component can be implemented using rectification unit. The rectifier unit can be used with or without a transformer. Further, the rectifier can also be implemented to change the voltage of electrical power 208.

Figure 4:
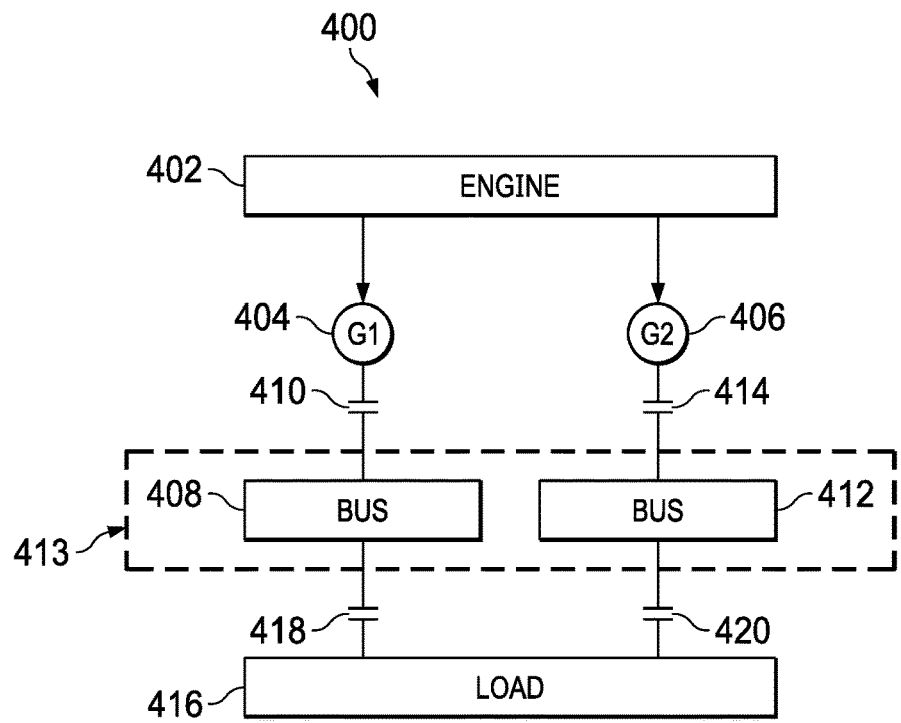
FIG. 4 is an illustration of an electrical generator system in accordance with an illustrative embodiment.

With reference now to FIG. 4, an illustration of an electrical generator system is depicted in accordance with an illustrative embodiment. In this illustrative example, electrical generator system 400 is an example of one implementation for electrical generator system 206 in FIG. 2.

As depicted, electrical generator system 400 is powered by engine 402, which can be an aircraft engine. For example, variable frequency generator (G1) 404 and variable frequency generator (G2) 406 in electrical generator system 400 are powered by engine 402. Engine 402 is a common prime mover for variable frequency generator (G1) 404 and variable frequency generator (G2) 406. In this depicted example, variable frequency generator (G1) 402 and variable frequency generator (G2) 404 have a mechanical phase difference of 180 degrees or plus or minus 60 degrees. The output of these variable frequency generators is electrical power in the form of an alternating current.

The output of variable frequency generator (G1) 402 is connected to bus 408 by switch 410. The output of variable frequency generator (G2) 404 is connected to bus 412 by switch 414. Bus 408 and bus 412 form bus system 413, which is an example of an implementation of bus system 216 in FIG. 2.

In this example, these variable frequency generators are connected in parallel. The electrical power output by each of these variable frequency generators has three phases.

As depicted, load 416 is connected to bus 408 by switch 418 and to bus 412 by switch 420. This connection to bus 406 and bus 408 provides an alternating current with six-phase power to load 416. Load 416 can be, for example, a line replaceable unit (LRU) in an aircraft such as a flight entertainment system, an environmental system, a navigation system, an engine indicating and crew alerting system (EICAS), or some other suitable system.

In this example, the size and weight of variable frequency generator (G1) 404 and variable frequency generator (G2) 406 can be less as compared to using generators that are designed to provide six-phase power. Further, the ability to provide six-phase power provides a reduction in the equipment for magnetics and transformers to provide phase power to load 416.

In this example, a first variable frequency generator, variable frequency generator (G1) 402, in the two variable frequency generators has an output with three phases connected to a first bus, bus 408. A second variable frequency generator, variable frequency generator (G2) 404, in the two variable frequency generators has a second output with three phases connected to a second bus, bus 412. The first bus and the second bus provide a six-phase output to a load, such as load 416, that uses six phases.

Figure 5:
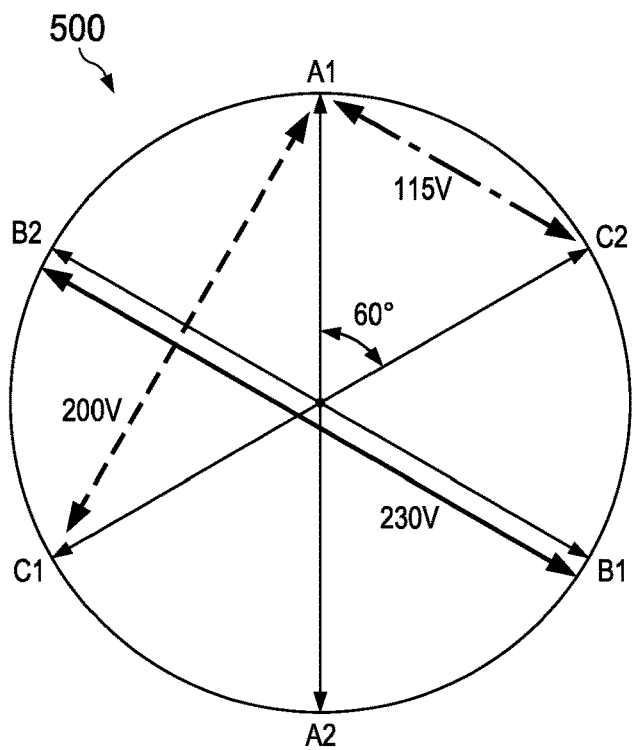
FIG. 5 is an illustration of a phasor diagram showing a relationship between phases in an operation of two variable frequency three electrical phase generators in accordance with an illustrative embodiment.

With reference next to FIG. 5, an illustration of a phasor diagram showing a relationship between phases in an operation of two variable frequency three electrical phase generators is depicted in accordance with an illustrative embodiment. In this illustrative example, phasor diagram 500 illustrates phases that may occur during operation of variable frequency generator (G1) 404 and variable frequency generator (G2) 406 in FIG. 4.

Phasor diagram 500 depicts the relative arrangement for three phases from generator (G1) 404 as A1, B1 and C1 in 120 electrical degrees of displacement, and three phases from generator (G2) 406 as A2, B2 and C2 with 120 electrical degrees of displacement. Relative to generator (G1) 404 and generator (G2) 406, the rotation of 180 electrical degrees, as illustrated, between phases A1 and A2, B1 and B2, and C1 and C2 produces a six-phase input to load 416. Two advantages of this six-phase input are (1) elimination of an internal load 416 transformer to convert three phases to six phases, and (2) higher electrical efficiency and if a rectifier is used, 230 volts line to line root-mean-square instead of 200 volts line to line root-mean-square result in up to a 15 percentage reduction in feeder currents for the same load electrical power consumption. Reduction of current to load 416 results in reduced electrical wire weight. Additionally, a balanced average current on each wire to load 416 results in a six-phase configuration, results in lower neutral currents with lower weight for aircraft, or other vehicle or structure, installations.

For load 416 with six phase, phasor diagram 500 depicts the adjacent phase terminal connections that enable a reduced line to line, or phase to phase, voltage difference. In an input termination to load 416, an A1, C2, B1, A2, C1 and B2 terminal arrangement would have 115 volts root mean square difference between adjacent terminal connections. In a three-phase arrangement, the A1, B1, C1 and A2, B2, C2 terminal arrangement would have 200 Volt root mean square voltage differences. This can allow closure connections or offer greater reliability for existing spacing. Scaling this arrangement to higher voltage systems, the load connection spacing to load 416 can be greatly reduced from if an only three-phase arrangement are used.

Figure 6:
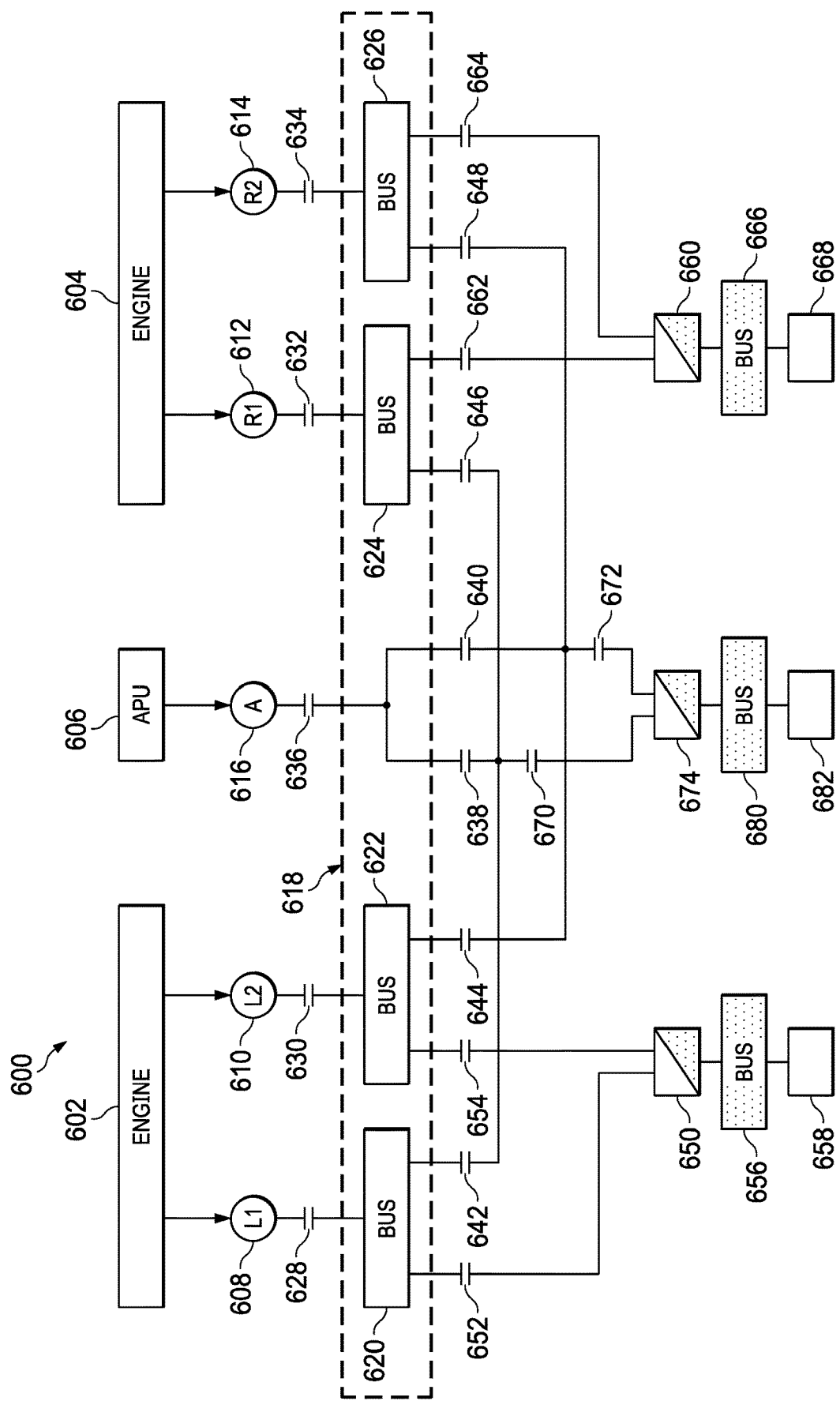
FIG. 6 is an illustration of an electrical generator system in accordance with an illustrative embodiment.

With reference now to FIG. 6, an illustration of an electrical generator system is depicted in accordance with an illustrative embodiment. In this illustrative example, electrical generator system 600 is an example of another implementation for electrical generator system 206 in FIG. 2.

As depicted, electrical generator system 600 is powered by engine 602, engine 604, and auxiliary power unit (APU) 606. These components are common prime movers and can be located in a platform such as aircraft 100 in FIG. 1 or aircraft 204 in FIG. 2. For example, engine 602 can be an example of engine 108 in FIG. 1 and engine 604 can be an example of engine 109 in FIG. 1. Auxiliary power unit (APU) 606 can be an example of auxiliary power unit (APU) 134 in FIG. 1.

Engine 602 is a common prime mover for variable frequency generator (L1) 608 and variable frequency generator (L2) 610, and engine 604 is a common prime mover for variable frequency generator (R1) 612 and variable frequency generator (R2) 614. Auxiliary power unit (APU) 606 is a common prime mover for generator (A) 616.

In this example, bus system 618 includes bus 620, bus 622, bus 624, and bus 626. Bus system 618 is an example of an implementation for bus system 216 in FIG. 2.

Variable frequency generator (L1) 608 is connected to bus 620 by switch 628, and variable frequency generator (L2) 610 is connected to bus 622 by switch 630. As depicted, variable frequency generator (R1) 612 is connected to bus 624 by switch 632, and variable frequency generator (R2) 614 is connected to bus 626 by switch 634.

Variable frequency generator (A) 616 is connected to switch 336, which in turn is connected to switch 638 and switch 640. This grouping of switches provides an ability to connect variable frequency generator (A) 616 to other buses in bus system 618 such that variable speed frequency generator (A) 616 can act as a backup for or failover in case one of the other variable frequency generators does not operate with a desired level of performance.

As depicted, bus 620 is connected to switch 642, bus 622 is connected to switch 644, bus 624 is connected to switch 646, and bus 626 is connected to switch 648. These switches also provide an ability for the variable frequency generators to be connected to other buses and act as backups or failover in case one or more variable frequency generators do not have a desired level of performance.

In this illustrative example, bus 620 is connected to auto transformer rectifier unit 650 by switch 652. Bus 622 is connected to auto transformer rectifier unit 650 by switch 654. This provides a parallel configuration of variable frequency generator (L1) 608 and variable frequency generator (L2) 610 with respect to auto transformer rectifier unit 650. Auto transformer rectifier unit 650 can change the voltage of the electrical power and convert alternating current power into a direct current power. Auto transformer rectifier unit 650 is connected to bus 656, which may in turn be connected to load 658 which uses direct current power in this illustrative example.

As depicted, bus 624 is connected to auto transformer rectifier unit 660 by switch 662. Bus 626 is connected to auto transformer rectifier unit 660 by switch 664. These switches provide a parallel connection of variable frequency generator (R1) 612 and variable frequency generator (R2) 614. Auto transformer rectifier unit 660 is connected to bus 666. Load 668 connected to bus 666 can use direct current power in this example.

In this particular example, switch 670 and switch 672 connect to switch 638 and switch 640, respectively. This connection allows for electrical power from variable frequency generator (A) 616 to be input into auto transformer rectifier unit 674, which is connected to bus 680. Load 682 connected to bus 680 obtains direct current electrical power from variable frequency generator (A) 616.

In this particular example, auto transformer rectifier unit 650, auto transformer rectifier unit 674 and auto transformer rectifier unit 660 are identical units to reduce different part designs in electrical generator system 600. For example, these auto transformer rectifier unit may be six-phase rectifiers selected to reduce the need of an auto transformer section for weight and cost considerations.

In another example, these auto transformer rectifier units may be multi-phase rectifiers above six phases for improved direct current power quality, such as twelve phases with twenty-four rectification diodes. These auto transformer rectifier units may have design features that takes advantage of a six-phase input or to mitigate non-normal conditions where only the phases from a single generator or non-synchronized combinations of three-phase electrical power if different prime move generators are mixed in their input to a common six-phase load.

In this illustrative example, since the auto transformer rectifier units, or rectifier units, can accommodate a three-phase input at reduced electrical power loading, a half power limit, the center direct current bus, bus 680, may be powered solely by the auxiliary power unit generator, variable frequency generator (A) 616, by closing switch 636, switch 638 and switch 670 and/or switch 636, switch 640 and switch 672. Relative to the direct current buses, bus 656, bus 680, and bus 666, electrical generator system 600 becomes a "split" three channel system. A single loss of an engine or auxiliary power unit, or a fault on an alternating current bus such as bus 620, bus 622, bus 624 or bus 626, or a direct current bus such as bus 656, bus 680 or bus 666, will still offer instantaneously two redundant electrical power direct current buses such as bus 656 and bus 680; bus 680 and bus 666; or bus 656 and bus 666 for flight critical loads or loads affecting flight characteristics of the aircraft 100 as a whole.

In this depicted example, variable frequency generator (A) 616 is an auxiliary power unit (APU) driven single three-phase generator that has a speed control unit. The speed control unit can adjust the shaft speed of the auxiliary power unit (APU) 606 so that variable frequency generator (A) 616 will match a disconnected main engine driven generator.

Being an independent engine, not related to the speed of the aircraft as in the main engines, engine 602 and engine 604, the speed control unit can control the mechanical phase through fuel control and electrical phase sensing with signals from the respective electrical generator system controls or generator control units for at least one of for variable frequency generator (L1) 608 and variable frequency generator (L2) 610, and engine 604 is a common prime mover for variable frequency generator (R1) 612 or variable frequency generator (R2) 614.

If variable frequency generator (L1) 608 is not available, the relative rotor angle for generator (A) 616 can be adjusted and maintained in the desired mechanical phase relative to variable frequency generator (L2) 610, and connected to bus 620 through closing switches, such as switch 636, switch 638, and switch 642. If variable frequency generator (L2) 610 is not available, the relative rotor angle for generator (A) 616 can be adjusted and maintained in the desired mechanical phase relative to variable frequency generator (L1) 610 and connected to bus 622 through closing switches such as switch 636, switch 640, and switch 644.

If variable frequency generator (R1) 612 is not available, the relative rotor angle for generator (A) 616 can be adjusted and maintained in the desired mechanical phase relative to variable frequency generator (R2) 614, and connected to bus 624 through closing switches, such as switch 636, switch 638, and switch 646. If variable frequency generator (R2) 614 is not available, the relative rotor angle for generator (A) 616 can be adjusted and maintained in the desired mechanical phase relative to variable frequency generator (R1) 612 and connected to bus 626 through closing switches such as switch 636, switch 640, and switch 664.

In this particular example, the electrical architecture in electrical generator system 600 offers the ability of an aircraft operator, or other vehicle with such a system, to operate in the event of a non-operational electrical generator. For twin propulsion engine aircraft, this enables "dispatch" (flight operations) with sufficient redundancy with a single generator out enabling greater aircraft, or vehicle, availability for use over single generator per propulsion engine architectures.

Figure 7:
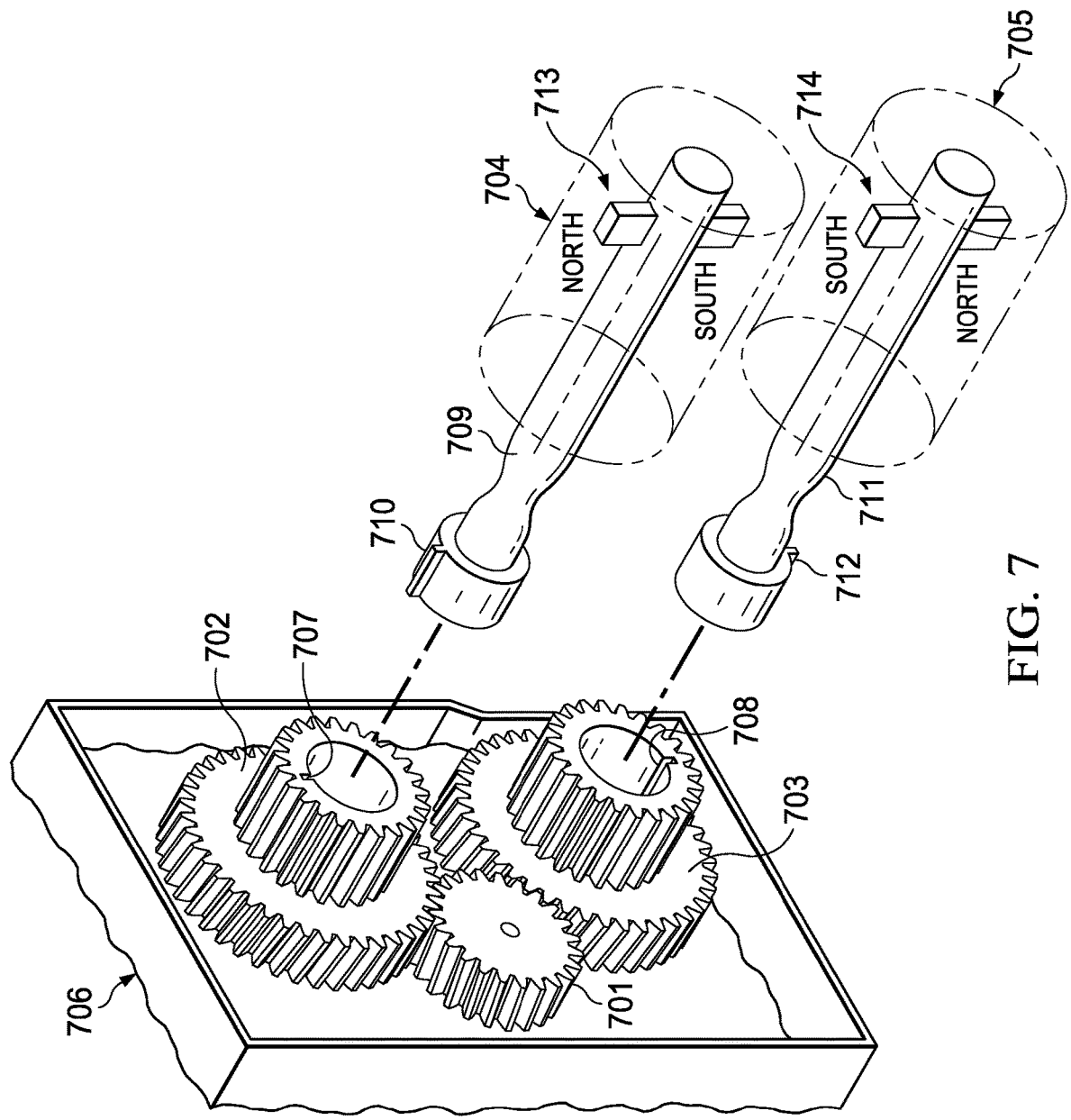
FIG. 7 is an illustration of a gear system connected to a pair of variable frequency generator rotors in accordance with an illustrative embodiment.

With reference now to FIG. 7, an illustration of a gear system connected to a pair of variable frequency generator rotors is depicted in accordance with an illustrative embodiment. A single prime mover rotates prime gear 701, which in turn rotates generator gear 702 and generator gear 703 to mechanically rotate variable frequency generator 704 and variable frequency generator 705. These two variable frequency generators are two-pole generators in the depicted example.

In this illustrative example, variable frequency generator 704 and variable frequency generator 705 are examples of variable frequency generators 212 in FIG. 2. As depicted, prime gear 701 is an example of prime gear 300 shown in block form in gear system 222 in FIG. 3. Generator gear 702 and generator gear 703 are examples of generator gears 302 in gear system 222 shown in block form in FIG. 3.

Generator gear 702 is installed within gearbox 706, such that the receiving feature 707 in generator gear 702 is aligned 180 mechanical degrees from receiving feature 708 for generator gear 703. In this illustrative example, receiving feature 707 and receiving feature 708 are examples of receiving features 308 shown in block form in FIG. 3.

In this illustrative example, variable frequency generator 704 has rotor 709 with feature 710. Variable frequency generator 705 has rotor 711 with feature 712. Rotor 709 and rotor 711 are examples of rotors 310 shown in block form in FIG. 3. Feature 710 and feature 712 are examples of features 306 shown in block form in FIG. 3.

In this illustrative example, variable frequency generator 704 and variable frequency generator 705 are installed via mechanical systems, such as a bolt pattern with bolts. As a result, the stators in variable frequency generator 704 and variable frequency generator 705 have the same orientation. These features are used for mechanical phase alignment.

As variable frequency generator 704 is mechanically inserted into position on gearbox 706, rotor 709 with feature 710 is placed into generator gear 702 with receiving feature 707. Similarly, when variable frequency generator 705 is installed onto gearbox 706, rotor 711 with feature 712 is aligned with receiving feature 708 in generator gear 703.

The result of this alignment of variable frequency generator 704 and variable frequency generator 705 is a 180 electrical degree orientation difference between rotor main field 713 and rotor main field 714. A rotor main field is the section of the variable frequency generator that generates a magnetic field to produce the main power of the variable frequency generator in its stator. The rotor main field produces a magnetic field that rotates from the spinning rotor.

Figure 8:
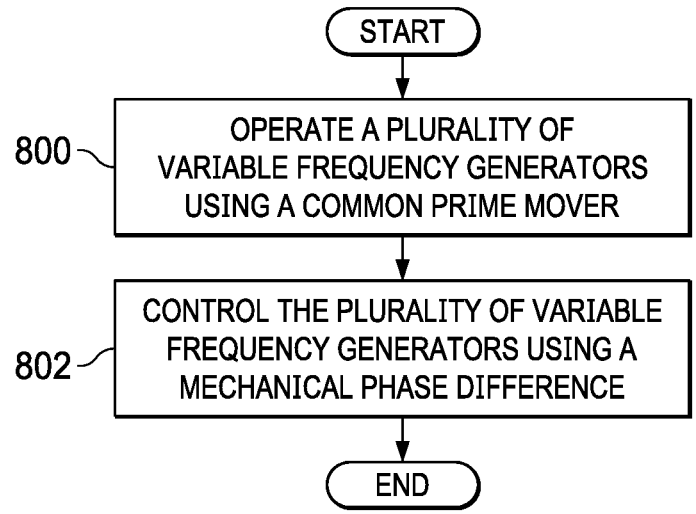
FIG. 8 is an illustration of a flowchart of a process for generating electrical power in accordance with an illustrative embodiment.

Turning next to FIG. 8, an illustration of a flowchart of a process for generating electrical power is depicted in accordance with an illustrative embodiment. The process illustrated in FIG. 8 can be implemented in electrical generator system 206 to generate electrical power 208 loads 210 in FIG. 2.

The process begins by operating a plurality of variable frequency generators using a common prime mover (operation 800). The process controls the plurality of variable frequency generators using a mechanical phase difference (operation 802). The process terminates thereafter. In operation 802, the mechanical phase difference is as follows:

$$MPD = 360/G\Phi p + cf$$

wherein MPD is the mechanical phase difference in degrees between rotors between a pair of variable frequency generators, G is a number of variable frequency generators, $\Phi$ is a number of electrical phases in a variable frequency generator in the plurality of variable frequency generators, p is a number of pole pairs in the variable frequency generator in the plurality of variable frequency generators, and cf is a correction factor based on an alignment of stators in the variable frequency generators.

Further in operation 802, the plurality of variable frequency generators is controlled such that each variable frequency generator in the plurality of variable frequency generators has a selected mechanical phase difference from another variable frequency generator in the plurality of variable frequency generators that is an integer multiple of the mechanical phase difference that less than 360 degrees.

Figure 9:
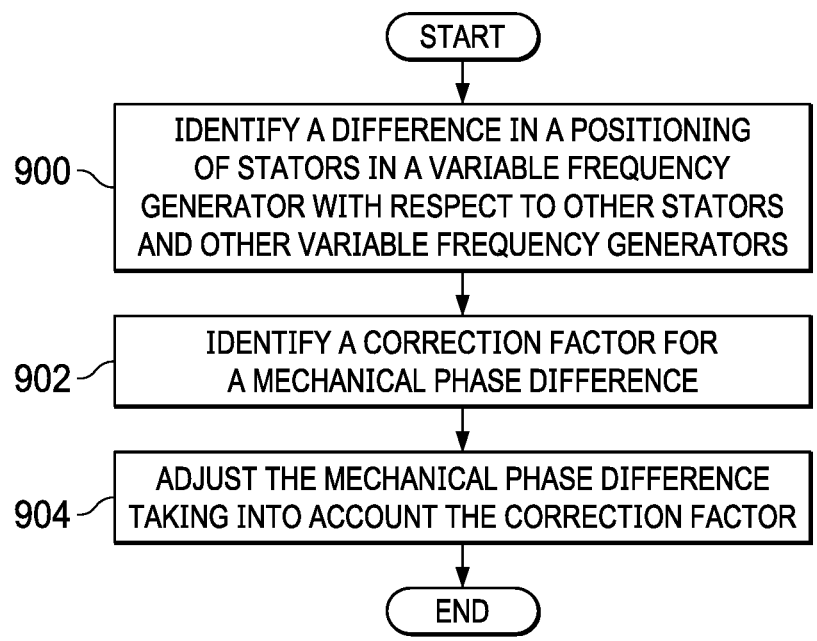
FIG. 9 is an illustration of a flowchart of a process for determining a correction factor for a mechanical phase difference in accordance with an illustrative embodiment.

With reference to FIG. 9, an illustration of a flowchart of a process for determining a correction factor for a mechanical phase difference is depicted in accordance with an illustrative embodiment. In this flowchart, operations are shown to determine a correction factor when the stators in the variable frequency generators are not identically positioned.

The change in positioning could occur due to environmental factors. These environmental factors may include, for example, the presence of installation volume limits, electrical wiring limitations for bending, proximity to hot sections of the engine installation, accessibility to generator oil servicing, accessibility for oil level inspection, or other objects that may cause a slight rotation or change in the orientation of the housing containing the stators.

The process begins by identifying a difference in the positioning of stators in a variable frequency generator with respect to other stators and other variable frequency generators (operation 900). The process identifies a correction factor for the mechanical phase difference (operation 902). If all of the stators in all of the variable frequency generators have the same orientation, the correction factor (cf) is zero. The process adjusts the mechanical phase difference taking into account the correction factor (operation 904). The mechanical phase difference with the adjustments forms the mechanical phase difference. The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware.

When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
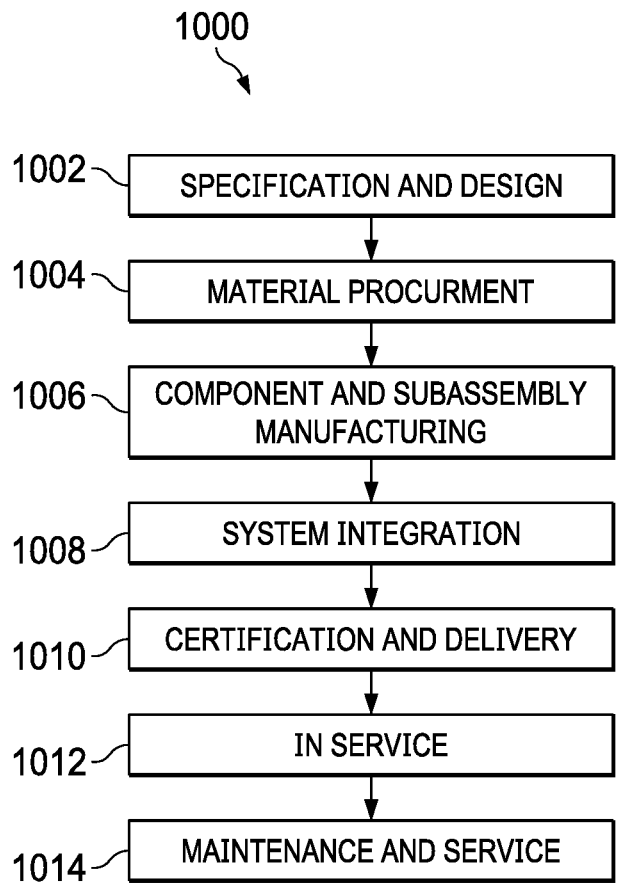
FIG. 10 is an illustration of a block diagram of an aircraft manufacturing and service method in accordance with an illustrative embodiment.
Figure 11:
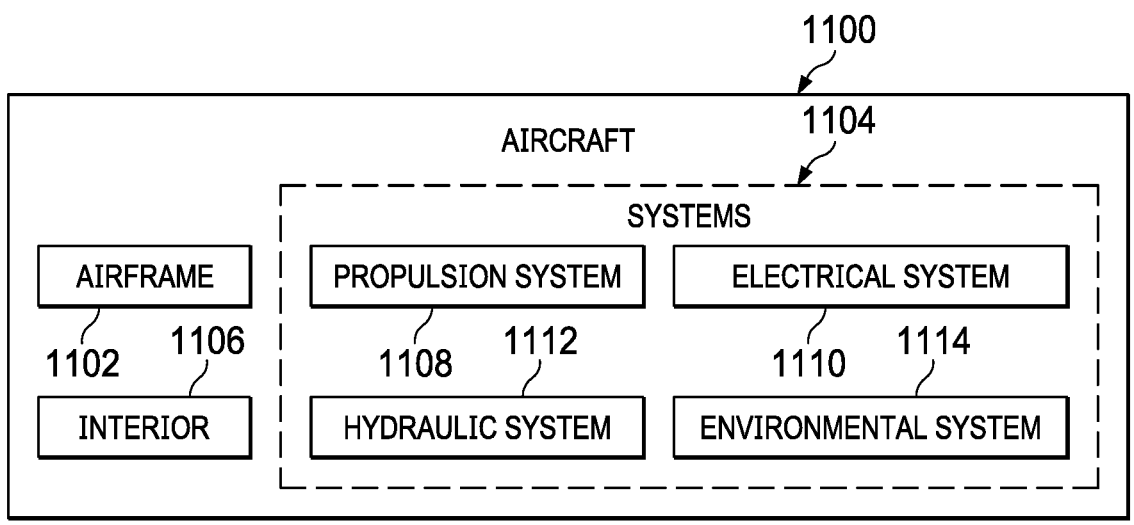
FIG. 11 is an illustration of a block diagram of an aircraft in which an illustrative embodiment may be implemented.

Illustrative embodiments of the disclosure may be described in the context of aircraft manufacturing and service method 1000 as shown in FIG. 10 and aircraft 1100 as shown in FIG. 11. Turning first to FIG. 10, an illustration of a block diagram of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of a block diagram of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. In the illustrative example, electrical system 1110 can be implemented by electrical system 120 in FIG. 1. One or more components in electrical generators system 206 can be implemented in electrical system 1110.

Any number of other systems may be included. Although an aerospace example is shown, different illustrative embodiments may be applied to other industries. For example, other industries include the automotive industry, shipbuilding industry, manufacturing and production facilities, test facilities, or other suitable industries.

Apparatuses and methods embodied herein may be employed during at least one of the stages of aircraft manufacturing and service method 1000 in FIG. 10. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

As depicted, components for electrical generator system 206 in FIG. 2 may be designed during specification and design 1002. The different components can be manufactured during component and subassembly manufacturing 1006 and assembled during system integration 1008. Further, electrical generator system 206 can be implemented or changes to mechanical phase difference as can be made while aircraft 1100 is in maintenance and service 1014 for different operations such as modification, reconfiguration, refurbishment, and other maintenance or service.

In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10. As yet another example, one or more apparatus embodiments, method embodiments, or a combination thereof may be utilized during production stages, such as component and subassembly manufacturing 1006 and system integration 1008 in FIG. 10. One or more apparatus embodiments, method embodiments, or a combination thereof may be utilized while aircraft 1100 is in service 1012, during maintenance and service 1014 in FIG. 10, or both. The use of a number of the different illustrative embodiments may substantially expedite the assembly of aircraft 1100, reduce the cost of aircraft 1100, or both expedite the assembly of aircraft 1100 and reduce the cost of aircraft 1100.

Thus, the illustrative examples provide a method, apparatus, and system for generating electrical power. In one illustrative example, a method for generating electrical power includes operating variable frequency generators using a common prime mover. The mechanical phase difference between the variable frequency generators are controlled in a manner that reduces undesired energy oscillations. A mechanical phase difference is identified as follows:

$$MPD = 360/G\Phi p$$

wherein MPD is the mechanical phase difference in degrees between the rotors between a pair of variable frequency generators, G is a number of variable frequency generators, $\Phi$ is a number of electrical phases in a variable frequency generator in the plurality of variable frequency generators, and p is the number of pole pairs in the variable frequency generator in the plurality of variable frequency generators. The variable frequency generators are controlled such that each variable frequency generator in the plurality of variable frequency generators has a selected mechanical phase difference from another variable frequency generator in the plurality of variable frequency generators that is an integer multiple of the mechanical phase difference that less than 360 degrees.

Thus, one or more illustrative examples provide an ability to align phases of different variable frequency generators with mechanical phase offsets in a manner that generates a different number of phases in the overall system of variable frequency generators. In the illustrative examples, the phase alignment of the variable frequency generators using a phase controller in the form of a gear system. This gear system can be a gearbox assembly that is connected to the common prime mover and the plurality of variable frequency generators.

One or more technical solutions are present in the illustrative example that overcome a technical problem with generating electrical power. As a result, one or more technical solutions in the illustrative examples can provide a technical effect of enabling connecting the electrical output of variable frequency generators in a manner that reduces undesired energy oscillations.

Also, one or more of the technical solutions can reduce undesired energy oscillations that include, for example, real and reactive instantaneous power oscillations and unwanted exchanges between generators, gears in gear systems, prime movers, and loads or other components connected to an electrical bus. Further, one or more of the technical solutions enable using variable frequency generators having a lower number of phases that can be combined in parallel to provide a higher number of phases for use by loads.

In the depicted example of the electrical architecture in FIG. 6, the speed control unit in auxiliary power unit (APU) 606 controls the speed of the auxiliary power unit (APU). This speed control unit can include the sense, communication and control logic, and features to enable generator (A) 616 to be controlled to replace any one of engine 602 or engine 604 driving generator (L1) 608, generator (L2) 610, generator (R1) 612, or generator (R2) 614.

Further, one or more technical solutions in the illustrative examples enable utilization of smaller generators to provide a desired number of phases in electrical power for loads that are not possible with currently available configurations of generators driven by aircraft engines or other common prime movers in an aircraft. Additionally, with the ability to operate smaller generators that output electrical power with phases equal to those by larger generators, a reduction weight and complexity can be achieved using one or more of the illustrative examples. Smaller generator diameters may enable smaller diameter engine installation designs, reducing overall engine nacelle drag and optimizing other performance measures.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An electrical generator system comprising:
a plurality of variable frequency generators connected to a common prime mover; and
a phase controller system configured to control the plurality of variable frequency generators using a mechanical phase difference as follows:

$$MPD = \frac{360}{G\Phi p}$$

wherein MPD is the mechanical phase difference in degrees between rotors between a pair of variable frequency generators, G is a number of variable frequency generators, $\Phi$ is a number of electrical phases in a variable frequency generator in the plurality of variable frequency generators, and p is a number of pole pairs in the variable frequency generator in the plurality of variable frequency generators, wherein the phase controller system controls the plurality of variable frequency generators such that each variable frequency generator in the plurality of variable frequency generators has a selected mechanical phase difference from another variable frequency generator in the plurality of variable frequency generators that is an integer multiple of the mechanical phase difference that is less than 360 degrees.

2. The electrical generator system of claim 1, wherein the phase controller system is configured to control the plurality of variable frequency generators using the mechanical phase difference as follows:

$$MPD = \frac{360}{G\Phi p} + cf$$

wherein cf is a correction factor based on an alignment of stators in the variable frequency generators.

3. The electrical generator system of claim 1 further comprising:
a gear system, wherein the gear system mechanically connects the plurality of variable frequency generators to the common prime mover.

4. The electrical generator system of claim 1, wherein the plurality of variable frequency generators is mechanically connected to the common prime mover using a gear system, wherein a feature on a rotor shaft of each of the plurality of variable frequency generators is mechanically connected to a receiving feature in a generator gear in the gear system such that each variable frequency generator in the plurality of variable frequency generators has a selected mechanical phase difference from another variable frequency generator in the plurality of variable frequency generators that is an integer multiple of the mechanical phase difference that is less than the 360 degrees.

5. The electrical generator system of claim 1 further comprising:
a bus system, wherein the plurality of variable frequency generators is connected in parallel to the bus system to produce electrical power with a desired number of electrical phases for a load, wherein a maximum number of system electrical phases available is as follows:

$$MSEP = G\Phi$$

wherein MSEP is the maximum number of system electrical phases, G is the number of variable frequency generators, and $\Phi$ is the desired number of electrical phases in the variable frequency generator in the plurality of variable frequency generators.

6. The electrical generator system of claim 1, wherein the phase controller system controls the plurality of variable frequency generators to operate with reduced undesired energy oscillations.

7. The electrical generator system of claim 1, wherein two variable frequency generators are in the plurality of variable frequency generators and the number of electrical phases is three per variable frequency generator, the number of pole pairs is one, and the mechanical phase difference is 60 degrees, wherein the two variable frequency generators operating in parallel generate an output voltage having six phases.

8. The electrical generator system of claim 7, wherein a first variable frequency generator in the two variable frequency generators has an output with three phases connected to a first bus and a second variable frequency generator in the two variable frequency generators has a second output with the three phases connected to a second bus, wherein the first bus and the second bus provide a six-phase output to a load that uses six phases.

9. The electrical generator system of claim 1, wherein the common prime mover is selected from one of an engine, an aircraft engine, an auxiliary power unit, a hydraulic motor, a ram air turbine, and a device with a rotating mechanical output.

10. The electrical generator system of claim 1, wherein the electrical generator system generates power for a load located in one of a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a wind turbine, a geothermal, hydroelectric or tidal electrical power generation system, a bridge, a dam, a house, a manufacturing facility, and a building.

11. An electrical generator system comprising:
a plurality of variable frequency generators configured to be connected to a common prime mover; and
a phase controller system configured to control the plurality of variable frequency generators using a mechanical phase difference as follows:

$$MPD = \frac{360}{G\Phi p}$$

wherein MPD is the mechanical phase difference in degrees between rotors between a pair of variable frequency generators, G is a number of variable frequency generators, Φ is a number of electrical phases in a variable frequency generator in the plurality of variable frequency generators, and p is a number of pole pairs in the variable frequency generator in the plurality of variable frequency generators, wherein the phase controller system controls the plurality of variable frequency generators such that each variable frequency generator in the plurality of variable frequency generators has a selected mechanical phase difference from another variable frequency generator in the plurality of variable frequency generators that is an integer multiple of the mechanical phase difference that is less than 360 degrees.

12. The electrical generator system of claim 11, wherein the common prime mover is selected from one of an engine, an aircraft engine, an auxiliary power unit, hydraulic motor, a ram air turbine, and a device with a rotating mechanical output.

13. The electrical generator system of claim 11, wherein the electrical generator system generates power for a load located in one of a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a wind turbine, a geothermal, hydroelectric or tidal electrical power generation system, a bridge, a dam, a house, a manufacturing facility, and a building.

14. A method for generating electrical power, the method comprising:
operating a plurality of variable frequency generators using a common prime mover; and
controlling the plurality of variable frequency generators using a mechanical phase difference as follows:

$$MPD = \frac{360}{G\Phi p}$$

wherein MPD is the mechanical phase difference in degrees between rotors between a pair of variable frequency generators, G is a number of variable frequency generators, Φ is a number of electrical phases in a variable frequency generator in the plurality of variable frequency generators, and p is a number of pole pairs in the variable frequency generator in the plurality of variable frequency generators, wherein the plurality of variable frequency generators are controlled such that each variable frequency generator in the plurality of variable frequency generators has a selected mechanical phase difference from another variable frequency generator in the plurality of variable frequency generators that is an integer multiple of the mechanical phase difference that is less than 360 degrees.

15. The method of claim 14, wherein a phase controller system is configured to control the plurality of variable frequency generators using the mechanical phase difference as follows:

$$MPD = \frac{360}{G\Phi p} + cf$$

wherein cf is a correction factor based on an alignment of stators in the plurality of variable frequency generators.

16. The method of claim 15, wherein mechanically connecting the plurality of variable frequency generators to the common prime mover using a gear system comprises:
mechanically connecting the plurality of variable frequency generators to the common prime mover using the gear system, wherein a feature on a rotor shaft of each of the plurality of variable frequency generators is mechanically connected to a receiving feature in a generator gear in the gear system such that each of the variable frequency generator in the plurality of variable frequency generators has a selected mechanical phase difference from another of the variable frequency generator in the plurality of variable frequency generators that is an integer multiple of the mechanical phase difference that is less than the 360 degrees.

17. The method of claim 14 further comprising:
mechanically connecting the plurality of variable frequency generators to the common prime mover using a gear system.

18. The method of claim 14 further comprising:
connecting the plurality of variable frequency generators connected in parallel to a bus system to produce power with a desired number of electrical phases to a load, wherein a maximum number of system electrical phases available is as follows:

$$MSEP = G*\Phi$$

wherein MSEP is the maximum number of system electrical phases, G is the number of variable frequency generators, and Φ is the desired number of electrical phases in a variable frequency generator in the plurality of variable frequency generators.

19. The method of claim 14, wherein the plurality of variable frequency generators is controlled to operate with reduced undesired energy oscillations.

20. The method of claim 14, wherein a first variable frequency generator in two variable frequency generators has an output with three phases connected to a first bus, and a second variable frequency generator in the two variable frequency generators has a second output with three phases connected to a second bus, wherein the first bus and the second bus provide a six-phase output to a load that uses six phases.

21. The method of claim 14, wherein the common prime mover is selected from one of an engine, an aircraft engine, an auxiliary power unit, hydraulic motor, a ram air turbine, and a device with a rotating mechanical output.

* * * * *